Sept. 23, 1941.   J. A. ARMSTRONG   2,256,700
METHOD AND APPARATUS FOR CLEANING FRUIT
Filed April 24, 1939   2 Sheets-Sheet 1
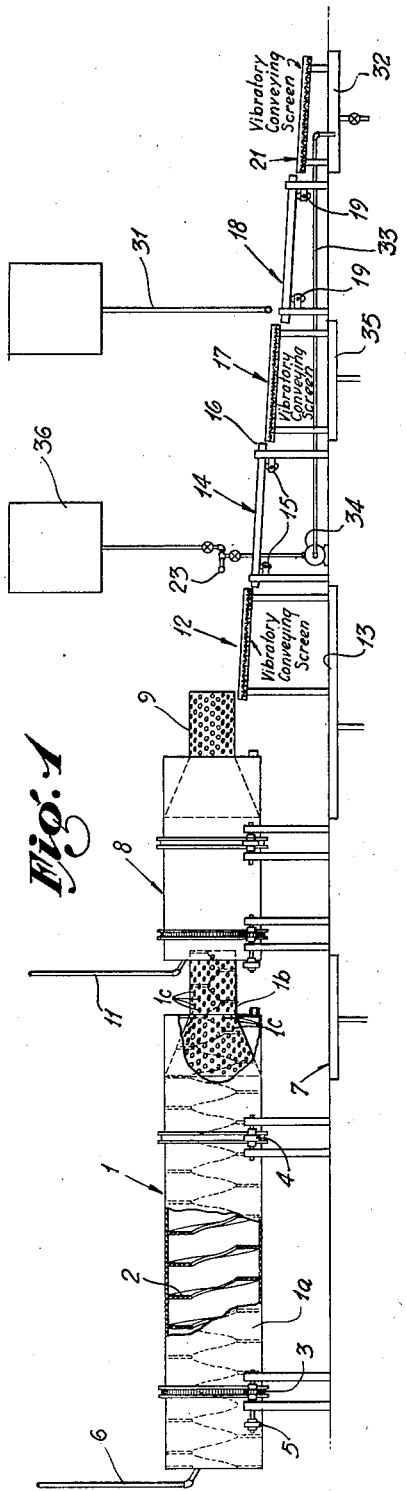
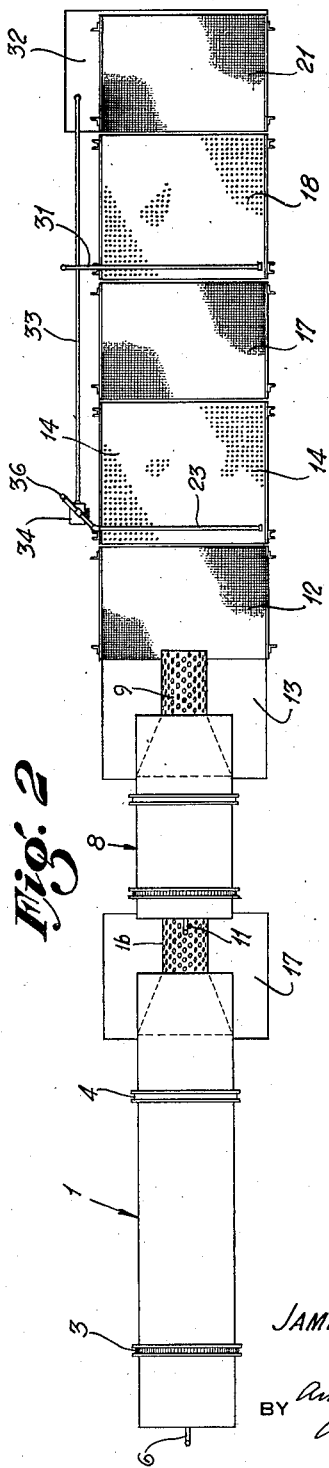
JAMES A. ARMSTRONG,
INVENTOR;
BY
ATTORNEYS.

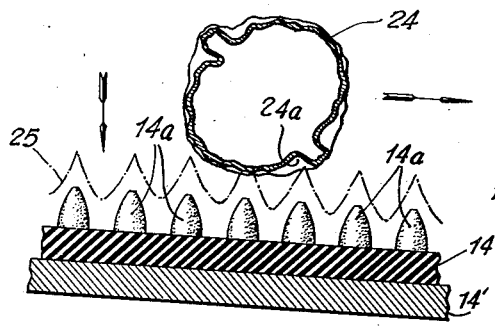
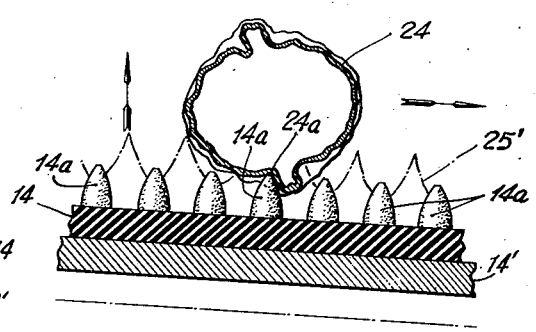
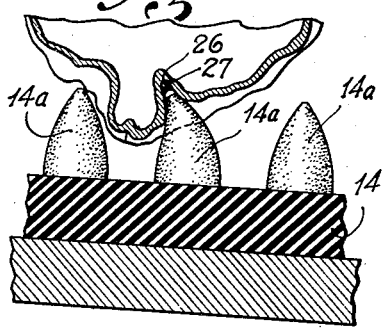
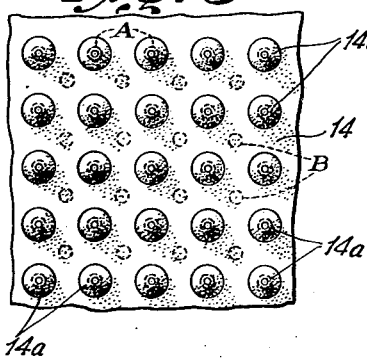
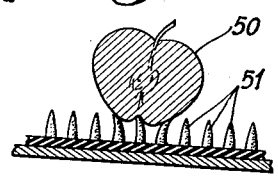
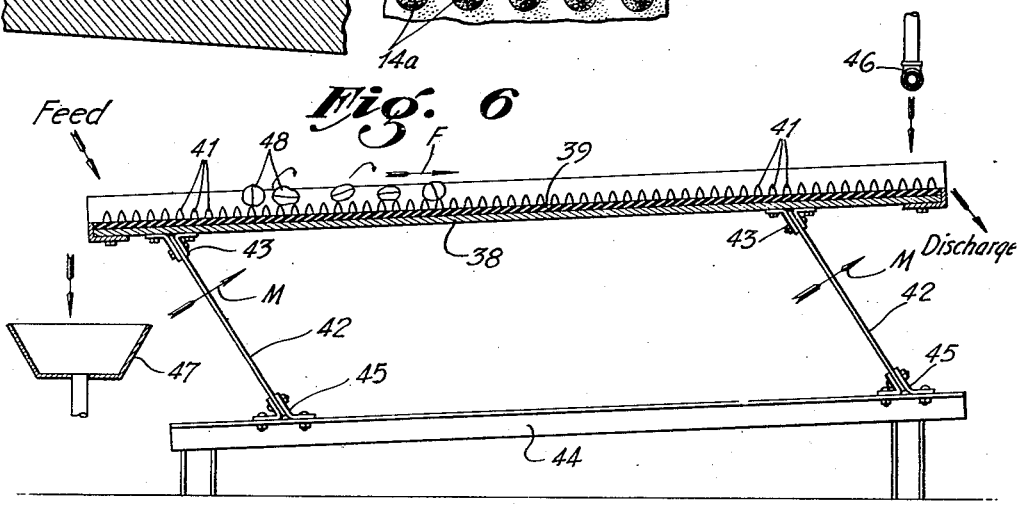
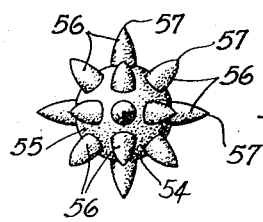

Patented Sept. 23, 1941

2,256,700

UNITED STATES PATENT OFFICE 2,256,700

METHOD AND APPARATUS FOR CLEANING FRUIT

James A. Armstrong, Los Angeles, Calif.

Application April 24, 1939, Serial No. 269,640

8 Claims. (Cl. 146—202)

This invention relates to the art of cleaning fruit, and pertains particularly to the cleaning of fruit having surface depressions in which dirt has lodged. The invention is particularly concerned with the cleaning of nuts and other fruits characterized by a rugose surface condition; in the ensuing description and claims the expression "fruit" will be taken in its rather broad botanical sense, and the application of the invention to all forms of articles or objects having surface depressions will be appreciated.

The principal object of the invention is that of providing a method and apparatus for dislodging dirt from the surface depressions of fruit and the like, without damage to the fruit itself, in an economical and effective manner; in its preferred embodiment, the method involves the use of a combined chemical and mechanical or physical procedure adapted to secure cleaning effects which may not be obtained through the use of chemical or physical procedures alone.

A particular object of the invention is to provide a method of and apparatus for the cleaning of fruits, in which the fruit is subjected to the concurrent action of a plurality of resiliently flexible plunger members adapted to enter and withdraw from the surface depressions of the fruit, and a hydraulic action provided by a moving liquid layer adjacent the fruit surface undergoing treatment.

A further object of the invention is to provide a method of and apparatus for the cleaning of fruit, in which certain gas-forming reagents are caused to be present at the position of the depressions in the surface of the fruit at the time the fruit is subjected to the physical cleaning treatment above set forth, wherefore the cleaning of the fruit results from the combined or joint action of the evolution of a gas within the dirt itself, and the scrubbing action resulting from the concurrent hydraulic and physical treatment of the fruit.

In its preferred embodiment, the invention contemplates the employment of gas-forming reagents adapted to exert a pronounced bleaching effect on the fruit, to improve the marketability of the fruit from the standpoint of color, and in this connection this application is a continuation-in-part of my Patent No. 2,155,923 dated April 25, 1939.

The ensuing description of the method and illustrative apparatus of the invention is particularly directed to the cleaning of nuts, such as walnuts, but the principles of the invention and the application thereof to other fruit, such as dried prunes, raisins, etc., and to fresh fruit such as oranges, lemons, apples and pears, will be apparent to those skilled in the art. All of the above fruit are characterized by a surface having one or more depressions, within which dirt is frequently present, and the removal of such dirt has heretofore presented a serious problem to the fruit-packing industry. In the packing of raisins, for example, a small amount of sand lodged in the rugose surface of the fruit will materially affect its marketability, while in the case of fresh fruits such as apples, it is often found that the calyx end of the fruit will retain a portion of the insecticidal spraying agent with which the fruit was treated during growth.

The accompanying drawings illustrate embodiments and applications of the invention, and referring thereto:

Fig. 1 is a side elevation of a cleaning unit such as may be employed in the cleaning of walnuts or the like, in which conventional cleaning elements such as tumblers are combined with specific apparatus according to this invention for the practice of the method of this invention;

Fig. 2 is a plan view thereof on the same scale;

Figs. 3 and 4 illustrate the relative movements of the fruit over the cleaning surface provided according to the invention, such relative movement comprising movement in both horizontal and vertical directions during the travel of the nut over the surface;

Fig. 5 is a plan view of the cleaning surface which may be employed according to the present invention;

Fig. 6 is a detailed view of a modification of the cleaning surface structure which may be employed according to the present invention, in which counter current flow of the nuts and liquid layer is secured;

Fig. 7 is a fragmentary view on enlarged scale, showing the pumping action of the resiliently flexible plunger members on dirt present in crevices or depressions in the surface of a nut shell;

Fig. 8 is a somewhat diagrammatic representation of the application of the invention to the treatment of a rather large fruit, such as an apple; and Fig. 9 is a side elevation of a form of device providing a plurality of projecting plunger members useful according to the present invention.

Referring to Figs. 1 and 2 of the drawings, a conventional walnut "tumbler" is indicated at 1 comprising a cylindrical portion 1a provided with an internal screw 2 and mounted for rotation on suitable guides 3 and 4, one of which may be provided with suitable driving means such as indicated at 5. One end of the tumbler 1 is provided with a reduced end portion 1b which is preferably perforated as indicated at 1c to provide a liquid drain and, in some cases, to also provide for the cleaning out of small sizes of nuts, such as are known to the trade as "peewees." A suitable fluid supply line is provided at the entrance end of the cylinder 1, as at 6, and a suitable drain or the like is provided as at 7 below the perforated portion 1b, to receive the liquid draining from the tumbler during normal operation. A second tumbler is indicated at 8 provided with a discharge end 9, corresponding generally to the tumbler shown at 1, but of shorter length. A suitable liquid supply member is indicated at 11 for supply of treating fluid to this secondary tumbler. At the discharge end 9 of the tumbler 8 I provide an inclined vibratory screen or draining member 12 provided with a subjacent drain 13 for the receipt of liquid discharged from the secondary tumbler 8. Adjacent the discharge end of the screen 12 I provide a cleaning table according to the present invention, such cleaning table comprising, in this embodiment, a transversely horizontal inclined conveying surface 14 provided with a plurality of upstanding resiliently flexible projections 14a, formed of rubber or the like and carried on a suitable support 14' as illustrated on greater scale in Figs. 3 through 5 and 7, such surface being inclined downwardly from adjacent the discharge end of the screen 12, and mounted for vibratory movement such as to have a substantial vertical component of motion. The vibratory moving means are indicated schematically at 15, and it will be appreciated that substantially any type of operating means may be employed for the purpose. The action of the surface 14 is substantially that of producing an up-and-down movement of the fruit out of and into engagement with the points of the projections 14a in passing over the surface, and due to the incline of the surface the fruit will be gradually worked toward the right-hand or discharge end 16.

Below the discharge end 16 of the surface 14 I preferably provide a vibratory conveying screen member 17 corresponding to the member 12 above, and adapted to receive the nuts discharged from the surface 14 and allow the liquid supplied to such surface as hereinafter described to be separated therefrom. Adjacent the discharge end of the screen 17, which is inclined downwardly away from the surface 14, I provide a second conveying surface 18 of the same character as the surface 14 and provided with vibratory members 19 corresponding to the members 15 above. Adjacent the discharge end of the screen 18 I provide an additional vibratory conveying screen member 21 corresponding to the screen members 12 and 17 above, adapted to receive the nuts discharged from the surface 18 and separate residual liquid therefrom. The nuts discharged from the end of the screen 21 may be conveyed to suitable drying chambers or the like according to conventional practice in the walnut packing industry.

According to the preferred practice of the method of the present invention, I may supply a solution of sodium hypochlorite to the entrance end of the tumbler 1, as at 6, and supply the walnuts to the entrance end in a continuous fashion. Upon rotation of the cylinder 1 through the driving means 5, the walnuts are worked longitudinally through the tumbler by the action of the screw 2, in contact with the liquid supplied at 6, a contact time of three to four minutes being allowed. As the nuts reach the portion 1b, the sodium hypochlorite solution will drain from the tumbler into the drain 7, and the nuts will be discharged into the tumbler 8. At this position additional clean or fresh sodium hypochlorite solution is added as at 11, the solution employed in this secondary tumbler being conveniently of the same strength as that employed at 6, and after discharge of the nuts from the discharge end 9 of the tumbler 8 onto the screen 12, the drained or separated liquid caught in the drain 13 may be pumped through suitable means not shown into the tumbler 1 through the connection 6, to effect economies in the consumption of sodium hypochlorite.

As the nuts are discharged from the screen 12 onto the surface 14, I concurrently supply a solution of hydrogen peroxide through a fluid discharge means 23 located at the receiving end of the surface 14, and the contact of this reagent with the residual sodium hypochlorite on the nut will cause the evolution of oxygen in gaseous condition. This gas will be evolved within the dirt located in the crevices and depressions in the nut shell upon contact by the hydrogen peroxide, and as the shells are worked downwardly over the surface 14, the several projections 14a on the surface 14 will be caused to enter and withdraw from the indentations or depressions in the surfaces of the nuts after the manner illustrated in Figs. 3, 4, and 7. The upward and downward oscillation of the surface 14, illustrated by the vertical arrows in Figs. 3 and 4, will cause the nut, indicated sectionally at 24, to move transversely of the surface 14, as indicated by the horizontal arrows at the righthand side of these respective figures. At the same time, the upward and downward movement of the surface 14 will cause the layer of solution supplied at 23 to rise upwardly in conical fashion above the tips of the projections or plungers 14a, after the manner indicated at 25 in dot-dash lines in Fig. 3. The frequency and amplitude of oscillation of the surface 14 will be so governed, with respect to the weight of the fruit 24 passing over the surface 14 and the quantity of liquid supplied to said surface, that the layer of liquid 25 will engage the surface of the fruit 24 during at least a portion of the relative movement of such fruit with respect to the surface 14. As the fruit falls downwardly upon the upwardly moving projections 14a of the surface 14, as illustrated in Fig. 4, the points of some of the projections 14a will enter the depressions, crevices, or grooves, of the fruit, as indicated particularly at 24a in Fig. 4, while the circulation of liquid about the lower surface of the nut will continue, after the general fashion indicated in dot-dash lines at 25' in Fig. 4. The walnuts shown in Figs. 3 and 4 are quite badly pinched adjacent the division points of the two halves of the walnut shell and the amount of pinching illustrated is in no sense an exaggeration. The particular nut illustrated in the drawings is a very correct cross-section of the shell of a walnut of the "Franquette" variety (the nut meat being omitted), and by referring to Fig. 7, particularly, it will be seen that the sharpness of the depressions, such as illustrated at 26, is such as to allow the dirt to impact quite solidly as shown at 27, necessitating rather vigorous brushing if the dirt is to be removed by conventional means. As the nut contacts a succession of the projections 14a in its travel over the surface 14, however, the successive partial entry and withdrawal of the points of the projections with respect to the depressions and the liquid circulation induced thereby will cause a pumping action which will gradually cause the dirt to slough away from the surface, it being appreciated that the dimensions of the tip portions of the projections 14a will be so selected with respect to a given type of fruit being handled that such tip portions will be capable of at least partially entering such depressions, wherefore the desired hydraulic action is obtained. This effect is materially accelerated by the chemical action of the reagent employed in the preferred practice of the invention, although the pumping action alone may be relied upon to secure effective cleaning of the fruit.

The "conical" distribution of the liquid on the surface of the cleaner appears to be a result of the effect of the projections 14a on the liquid by reason of the relative upward and downward movement, and when the surface is given as substantially vertical upward and downward motion, the "cones" are found to be disposed substantially above the tips of the plungers or projections 14a during downward movement of the surface, as shown by the dotted circles at "A" in Fig. 5, and substantially intermediate the tips of the projections during upward movement of the surface 14, as shown by the dotted circles "B" in Fig. 5. This relation is also indicated by the dot-dash lines in Figs. 3 and 4.

Where an apparatus arrangement of the type shown in Figs. 1 and 2 is employed, hydrogen peroxide of relatively high strength is supplied in contact with the fruit at the table 18, as through the agency of a supply means 31. The nuts on the table 18 are thus subjected to high strength peroxide, preferably on the order of 5 to 25 volume strength, as set forth in my Patent No. 2,155,923, and this high strength peroxide is drained from the nuts at the screen 21 into a sump 32, where it is picked up through a conduit 33 and conveyed to the fluid discharge means 23 through the agency of a pump 34 into contact with the nuts which are impregnated with the sodium hypochlorite from the treatment in the tumblers 1 and 8. The residual peroxide solution drained from the nuts at 17 into a sump 35 may be passed to waste.

Where it is not desired that the nuts be subjected to a bleaching operation, but it is found that the dirt present in the depressions of the nut is removed wtih difficulty when the fluid layer on the surfaces 14 and 18 comprises only water, a solution of sodium carbonate or sodium bicarbonate may be supplied into the tumbler 1 at 6 and into the tumbler 8 as at 11, and a dilute acid solution may be supplied to the fluid discharge means 23 from a supply tank 36, all of the common mineral acids being useful in this connection. When acid is supplied from 36 in the cleaning of nuts, however, I prefer to wash the nuts with plain water at the surface 18 following the acid treatment, in which case the supply 31 will be filled with water rather than hydrogen peroxide as above described.

In Fig. 6 I have illustrated a treatment surface which may be substituted for the surfaces 14 and 18 in Figs. 1 and 2, where it is desired to secure a countercurrent flow of the liquid layer and the fruit, as may be desirable at 18 where the greatest degree of cleanliness is desired. The structure may comprise a table member 38 provided with a surface layer 39 having a plurality of upstanding resiliently flexible, projecting plunger members 41 corresponding to the plunger members 14 above, said table being mounted for vibratory movement along an inclined path having a substantial component of vertical motion. The mounting may conveniently be provided through the agency of a plurality of upstanding inclined supporting reeds 42 secured to the table through the agency of brackets 43 and to a suitable supporting means 44 at their lower ends through bracket 45. The table may be oscillated by driving the device through the agency of an electromagnetic motor means, an eccentric drive, or the like, in such manner, for example, as to give a resultant movement along the direction indicated by the arrows M and provide, essentially, an upwardly inclined vibratory conveyor. The nuts or fruit may be supplied to the conveyor at the left-hand or lower end, and in operation of the device will be caused to move forwardly in the general direction of the arrow F toward the upper or discharge end of the structure. The treating solution or other liquid which is provided over the surface of the device is supplied to the upper end as at 46, and such solution will move downwardly along the inclined surface 39 to the lower end thereof and be discharged into a sump or the like indicated at 47. The motion imparted to the surface 39 is such as to impart the desired forward motion to the nuts, indicated at 48, but this motion will not be imparted to the liquid layer on the surface 39 and the countercurrent travel of nut and liquid is thus assured.

As above brought out, the method and device of the present invention are applicable to the treatment of any fruit having surface depressions in which dirt is found to lodge, and as illustrated in Fig. 8, I have shown the application of the invention to the treatment of a fruit such as an apple, indicated at 50. Where relatively large fruit, such as apples, are treated by the process, the upstanding pointed projections indicated at 51 will be made somewhat larger and more robust than the projections indicated at 14a in order to withstand the increased load of the fruit. The spacing of the projections 51 will be selected so that the points thereof may enter the calyx end of the fruit and dislodge dirt therefrom. It will be appreciated that in order to further the dislodgment of incrustation of dirt, spraying compound or the like from the calyx end of the fruit, it may be desirable to first treat the fruit with a gas-forming reagent, such as an alkali metal carbonate, and subsequently treat the fruit with an acid reagent adapted to evolve carbon dioxide from the alkali metal carbonate, as above described. The application of the invention, therefore, to the treatment of fruit other than nuts will be apparent to those skilled in the art.

In Fig. 9 I have illustrated a modified or star-shaped form of contact member carrying the plurality of projecting resiliently flexible plunger members which may be utilized to treat the nuts or other fruit in a tumbling operation. The structure illustrated in Fig. 9 may comprise essentially a center or base portion 55 provided with a plurality of outwardly projecting rubber teats 56 having pointed outer ends 57. A plurality of stars 54 may be fed into a tumbler such as shown at 1 along with the nuts, and the nuts and stars tumbled together in passing along the spiral 2, during which contact in the presence of the liquid layer supplied through the connection 6, the projections 56 will at least partially enter and withdraw from the depressions in the nuts and secure the desired pumping action. The application of this phase of the invention to the treatment procedure in which gas-evolving and/or bleaching chemicals are employed will be apparent.

Where an apparatus layout of the general character shown in Figs. 1 and 2 is employed, it will be appreciated that the drain sections 12, 17, and 21 may be made as stationary inclined screens, as long as sufficient slope is provided to cause the nuts to move ahead. The vibratory conveyor construction is in general to be preferred, however, in view of the height requirements imposed by gravity type conveying means.

Other modifications of the invention will occur to those skilled in the art, wherefore I do not choose to be limited to the specific embodiments herein delineated and described, but rather to the scope of the subjoined claims.

I claim:

1. The method of cleaning dirt from fruit having surface depressions within which such dirt is lodged, which comprises: agitating in contact with said fruit a cleaning member provided with a plurality of resiliently flexible plunger members which have tip portions of such size as to be capable of at least partly entering such surface depressions, while providing a moving layer of liquid at the position of such fruit, to cause said plunger members to be moved into and to be withdrawn from such depressions, to wash adhering dirt particles from such depression under the combined effect of the action of such plunger member and the hydraulic action of such liquid layer.

2. The method of cleaning fruit having surface depressions containing adhering dirt, which comprises: passing such fruit laterally over a surface provided with a plurality of upstanding resiliently flexible pointed projections while causing such surface to oscillate in a path having a substantial component of movement in a vertical direction, to cause relative movement between such fruit and said projections in both vertical and horizontal directions; causing a layer of liquid to move over such surface in position to contact such fruit during at least a portion of such relative movement, said pointed projections being of such size at their upper ends with respect to the size of such projections as to at least partly enter such depressions during contact with such fruit.

3. The method of cleaning fruit having surface depressions containing adhering dirt, which comprises: passing such fruit laterally in one direction over a surface provided with a plurality of upstanding resiliently flexible pointed projections while causing such surface to oscillate in a path having a substantial component of movement in a vertical direction, to cause relative movement between such fruit and said projections in both vertical and horizontal directions; causing a layer of liquid to move laterally over such surface countercurrent to the movement of said fruit, in position to contact such fruit during at least a portion of such relative movement, said pointed projections being of such size at their upper ends with respect to the size of such depressions as to at least partly enter such depressions during contact with such fruit.

4. The method of cleaning fruit having surface depressions containing adhering dirt, which comprises: contacting such fruit with a liquid containing a non-toxic gas-forming reagent in solution, to cause impregnation of such adhering dirt with such solution; passing such fruit through an agitation zone in intermittent contact with a plurality of resiliently flexible pointed plunger members; contacting such fruit with a second solution containing a reagent in solution which will chemically react with said first reagent in the evolution of a gas therefrom, to cause evolution of such gas within such adhering dirt and further cause (by the relative movement between said fruit and plungers due to the agitation in said agitation zone) such plunger members to alternately enter and withdraw from said depressions, to wash such adhering dirt from such depressions through the combined effect of the blasting action of the evolved gas, the action of such plunger members, and the hydraulic action of such liquid layer.

5. The method of cleaning fruit set forth in claim 4, in which said first reagent comprises an alkali metal hypochlorite and said second reagent comprises hydrogen peroxide.

6. An apparatus for cleaning fruit, which comprises: supporting means; a conveying table member resiliently mounted on said supporting means and having a substantially flat conveying surface provided with a plurality of spaced upstanding resiliently flexible pointed projections; means for oscillating said table member to impart to said projections a movement having both vertical and horizontal components of motion; means for supplying a quantity of fruit to said table member; and supply means for supplying a quantity of fluid to said conveying surface of said table member to maintain a layer of such fluid thereon.

7. An apparatus for cleaning fruit which comprises: supporting means; an elongated transversely horizontal downwardly inclined conveying table member provided with a plurality of spaced upstanding resiliently flexible pointed projections; means for supplying fruit to said table member at the upper end thereof; means for vibrating said table member to impart to said projections a substantially vertical upward and downward movement, to cause said fruit to move into and out of contact with said projections and to travel towards the lower end of said table member; and supply means for supplying fluid to the upper end of said conveying surface of said table member in such quantity as to maintain a layer of such fluid thereon.

8. An apparatus for cleaning fruit, which comprises: supporting means; an inclined elongated conveying table member resiliently mounted on said supporting means and having a substantially flat conveying surface provided with a plurality of longitudinally and transversely spaced upstanding resiliently flexible pointed projections; means for supplying fruit to said table at the lower end thereof; means for vibrating said table member to impart to said conveying surface and said projections a movement having vertical and horizontal components of motion to cause said fruit to move relative to the plane of said conveying surface into and out of contact with said projections and to travel towards the upper end of said table member; and supply means for supplying fluid to the upper end of said table member in countercurrent flow to said fruit in such quantity as to maintain a layer of such fluid on said conveying surface.

JAMES A. ARMSTRONG.